(12) United States Patent
Puri et al.

(10) Patent No.: US 7,152,124 B1
(45) Date of Patent: Dec. 19, 2006

(54) METHOD AND SYSTEM FOR MAINTAINING TEMPORAL CONSISTENCY OF RESOURCES AND DATA IN A MULTIPLE-PROCESSOR PACKET SWITCH

(75) Inventors: Rahoul Puri, Los Altos, CA (US); Susan Carrie, Mountain View, CA (US); Erik de la Iglesia, Mountian View, CA (US)

(73) Assignee: Extreme Networks, Santa Clara, CA (US)

( * ) Notice: Subject to any disclaimer, the term of this patent is extended or adjusted under 35 U.S.C. 154(b) by 876 days.

(21) Appl. No.: 10/073,538

(22) Filed: Feb. 11, 2002

(51) Int. Cl.
*G06F 15/173* (2006.01)
*G06F 3/00* (2006.01)
*G06F 9/30* (2006.01)

(52) U.S. Cl. .............. 710/20; 710/36; 710/20; 709/225; 709/226; 712/220; 712/203

(58) Field of Classification Search ........ 711/141, 711/145, 147; 709/106, 100, 244, 238, 226, 709/312; 710/36, 20, 107, 32, 21, 7; 370/389, 370/412, 468, 392, 395.21; 718/104
See application file for complete search history.

(56) References Cited

U.S. PATENT DOCUMENTS

| | | | |
|---|---|---|---|
| 5,528,761 A * | 6/1996 | Ooba et al. ............ | 709/237 |
| 6,018,516 A | 1/2000 | Packer .................. | 370/231 |
| 6,044,468 A | 3/2000 | Osmond ................ | 713/201 |
| 6,091,733 A | 7/2000 | Takagi et al. .......... | 370/401 |
| 6,195,703 B1 | 2/2001 | Blumenau et al. ...... | 709/238 |
| 6,247,060 B1 | 6/2001 | Boucher et al. ........ | 709/238 |
| 6,298,380 B1 | 10/2001 | Coile et al. ........... | 709/227 |
| 6,532,487 B1 * | 3/2003 | Perks .................. | 718/106 |
| 6,549,961 B1 * | 4/2003 | Kloth .................. | 710/36 |
| 6,839,811 B1 * | 1/2005 | Fujiyama .............. | 711/141 |

OTHER PUBLICATIONS

Dykstra; *Gigabit Ethernet Jumbo Frames: and why you should care*; http://sd.wareonearth.com/~phil/jumbo.html (Dec. 20, 1999).
Homig, *Network Group RFC: 894: DARPA Internet Program Protocol Specification* (Apr. 1984).
Information Sciences Institute, University of Southern California, *Internet Protocol RFC: 791; DARPA Internet Program Protocol Specification* (Sep. 1981).
Information Sciences Institute, University of Southern California, *Transmission Control Protocol RFC: 793; DARPA Internet Program Protocol Specification* (Sep. 1981).
Postel, *Network Working Group RFC: 879; DARPA Internet Program Protocol Specification* (Nov. 1983).

* cited by examiner

*Primary Examiner*—Hanh Nguyen
(74) *Attorney, Agent, or Firm*—Howrey LLP

(57) ABSTRACT

A network switch architected using multiple processor engines includes a method and system for ensuring temporal consistency of data and resources as packet traffic flows through the switch. Upon receiving a connection request, the switch internally associates a semaphore with the connection. The semaphore is distributed and stored at the processing engines. Each of the processing engines performs specific operations relating to incoming packets associated with the connection. Internal messages are passed between the processing engines to coordinate and control these operations. Some of these messages can include a semaphore value. Upon receiving such a message, a processing engine compares the semaphore value to a stored semaphore. Packets relating to the connection identified by the message are processed if there is a match between the semaphores. Also, the semaphore value can be moved from one processing engine to another in order to control the allocation and de-allocation of resources.

19 Claims, 18 Drawing Sheets

NEW CONNECTION

PACKET CODES
| 0 1 | RESERVED(7 h0) | &TCB | |
|---|---|---|---|
| MSB (33) | | | LSB (0) |

PACKET CODES      RESERVED (1 b0)
| 1 0 | GENERATION COUNT | APP. CLASS | SERVICE POLICY INDEX (BSI) | |
|---|---|---|---|---|
| MSB (33) | 23\|22 | | 16\|15 | LSB (0) |

| ELEMENT | BITS | DESCRIPTION |
|---|---|---|
| PACKET CODES | 2 | 2'b11: INVALID/RESERVED (FOR TIMESTAMP, FORMAT TBD).<br>2'b01: START OF PACKET: {NEW, &TCB}<br>2'b10: END OF PACKET: {APPLICATION CLASS, SERVICE POLICY INDEX}<br>2'b00: INVALID/RESERVED. |
| NEW CONNECTION | 1 | LOGIC 1 INDICATES A NEWLY ESTABLISHED CONNECTION;<br>LOGIC 0 INDICATES A "CAM HIT" ON A CURRENTLY ACTIVE CONNECTION. |
| RESERVED | AS NEEDED | LOGIC 0; RESERVED |
| &TCB | 24 | POINTER TO A FLOW TCB OR A CLIENT TCB OR A RST/DRP/IGN POINTER. |
| GENERATION COUNT | 8 | NUMBER OF TIMES THIS &TCB HAS BEEN RECYCLED. |
| APPLICATION CLASS | 7 | APPLICATION CLASS FIELD FROM SERVICE LOOKASIDE CAM. |
| SERVICE POLICY INDEX | 16 | SERVICE POLICY INDEX FROM SERVICE LOOKASIDE CAM (a.k.a. "BSI"). |

FIG.7A

| 6-BIT PACKET TAGS | 6-BIT MESSAGE TAGS | 64-BIT PACKET DATA | | |
|---|---|---|---|---|
| SOM | COM | &xTCB | PROTO | Src IP ADDRESS |
| SPM | NOP | SERVICE POLICY \|\| tlabel | RESERVED | SERVER INDEX |
| SHM | NOP | RESERVED | GENCNT | HISTORY POINTER |
| EOM | NOP | DEST IP ADDRESS | Src PORT # | DEST PORT # |

SERVICE POLICY IS A 22-BIT QUANTITY;
BIT NUMBER 57 IN THE UPPER SPM RESERVED FIELD IS USED TO INDICATE THE CLIENT FLAG;
tlabel IS A 6-BIT TRANSACTION LABEL TO BE RETURNED TO PAKMAN UPON COMPLETION OF COM;
ALL OTHER DATA FIELDS ARE ALIGNED ON 8-BIT BOUNDARIES AS INDICATED BY THE | MARKS.

FIG.7B-1

MARKER PACKET QUEUE TAGS SUMMARY

| ENCODING | BITS | DESCRIPTION |
|---|---|---|
| SOM | 6 | START OF MARKER PACKET: &TCB + PROTOCOL + Src IP ADDRESS |
| SPM | 6 | SERVICE POLICY MARKER: CLIENT FLAG + 22-BIT SERVICE POLICY + 16 BIT SERVER INDEX. |
| SHM | 6 | SERVICE HISTORY MARKER: 32-BIT RESERVED FIELD + 32-BIT HISTORY POINTER |
| EOM | 6 | END OF MARKER PACKET: DEST IP ADDRESS + Src AND DEST PORTS |
| COM | 6 | COMMAND: OPTIONS APPEAR IN TABLE 5-2 BELOW; USUALLY DELETE. |
| NOP | 6 | LOGIC 0; RESERVED; IGNORE PACKET DATA AND MESSAGE TAGS |

MARKER PACKET QUEUE COM OPTIONS SUMMARY

| ENCODING | BITS | DESCRIPTION |
|---|---|---|
| ADD | 6 | ASSOCIATE THE &xTCB WITH THE 5-TUPLE KEY, AND RETURN THE TRANSACTION LABEL BACK TO PAKMAN. |
| DEL | 6 | DELETE THE ASSOCIATION OF THE 5-TUPLE KEY. (&xTCB NOT REQUIRED) RETURN THE TRANSACTION LABEL BACK TO PAKMAN. |
| PASS | 6 | SEND DELETE DATAGRAM TO PE, BUT DO NOT CHANGE STATE OF BLT CAM's. |
| NOP | 6 | LOGIC 0; RESERVED |

FIG.7B-2

– BLT – PE POST FORMAT FOR DELETE THE CONNECTION

| 33 | 32/31 | 30/29 | 24/23 | 16 | 0 |
|----|-------|-------|-------|-----|---|
| SOP | CMD | TLABEL | GEN_CNT | &TCB | |
| MOP | | | | SERVICE POLICY | |
| MOP | | TIP | | | |
| MOP | | SERVICE INDEX | | TP | |
| EOP | | | | HISTORY Ptr | |

POSTED WRITE DATA ELEMENT SUMMARY

| ELEMENT | BITS | DESCRIPTION |
|---------|------|-------------|
| CMD | 2 | CMD 1 SERVER DELETE<br>CMD 2 CLIENT DELETE |
| TLABEL | 6 | LABELS FOR ADD OR DELETE |
| SERVICE POLICE | 22 | SERVICE POLICE INDEX FOR MAPPING TO SERVER IP ADDRESS |
| SERVER INDEX | 16 | ADDRESS POINTER TO LOCATE THE SERVER TABLE |
| TIP | 32 | TALISMAN'S IP ADDRESS |
| TP | 16 | TALISMAN'S PORT |
| &TCB | 24 | TCB ADDRESS POINTER |
| TIME STAMP | 32 | TBD |

FIG.7C-1

BLT – PE POST FORMAT FOR NEW SERVICE

| | 33 | 32/31 | 30/29 | 23/22 | 16/15 | 0 |
|---|---|---|---|---|---|---|
| 01 | SOP | CMD | RESERVED | CLASS | SERVICE POLICY | |
| 00 | MOP | | | SrcIP | | |
| 00 | MOP | GEN_CNT | | &fTCB | | SrcPORT |
| 10 | EOP | | RESERVE | | | |

– POSTED WRITE DATA ELEMENT SUMMARY

| ELEMENT | BITS | DESCRIPTION |
|---|---|---|
| CMD | 2 | CMD – 0 &fTCB, NEW SERVICE |
| SERVICE POLICE | 16 | SERVICE POLICE INDEX FOR MAPPING TO SERVER IP ADDRESS |
| SrcIP | 32 | CLIENT IP ADDRESS THAT REQUEST FOR SERVICE |
| &fTCB | 24 | FLOW TCB ADDRESS POINTER |
| TIME STAMP | 32 | FOR TRACKING THE PACKET INSIDE EACH BLOCK. TBD |

FIG.7C-2

NEW PACKET

| | 32/31 | 30/29 | 24/23 | | 0 |
|---|---|---|---|---|---|
| SOP 33 | CMD | NULL | | &fTCB OR &sTCB | |
| MOP | | | | &cTCB | |
| MOP | | | | SrcIP | |
| MOP | | | | TIP | |
| MOP | | | | ServerIP | |
| MOP | | | TPO | Tsequence | |
| MOP | | | | ServerPO | |
| MOP | | | | MAC ADDRESS | |
| MOP | | | Vlan TAG | MAC ADDRESS (HIGH TWO BYTE) | |
| MOP | | GEN_CNT | | SERVER INDEX | |
| MOP | | | | CSI/BSI | |
| EOP | | | | HISTORY POINTER | |

FOR DELETE PACKET

| | 32/31 | 30/29 | 24/23 | | 0 |
|---|---|---|---|---|---|
| SOP 33 | CMD | TLABEL | | &fTCB OR &sTCB | |

FIG.7D

PM – EMU POST FORMAT

| 63 | 59 | 15 | |
|---|---|---|---|
| CMD | OPTIONS | TOTAL LENGTH | FIRST WORD |
| COMMAND | | | |

| OPTIONS |
|---|
| TCB (128 BYTES) |
| OPTIONAL DATA (UP TO BUFFER SIZE) |

TRANSACTION

PM COMMANDS TO EMU

| COMMAND NAME | COMMAND FIELD | REQUIRED FIELDS |
|---|---|---|
| PM RESET | 'h1 | BUFFER NUMBER |
| PM LockSN | 'h2 | BUFFER NUMBER, GENERATION COUNT AND SEQUENCE NUMBER |
| PM READ | 'h3 | BUFFER NUMBER AND GENERATION COUNT |
| PM PURGE | 'h4 | BUFFER NUMBER |
| PM POST WITH DefAck | 'h5 | BUFFER NUMBER, GENERATION COUNT, SEQUENCE NUMBER, TCB AND DATA |
| PM POST | 'h6 | BUFFER NUMBER, GENERATION COUNT, SEQUENCE NUMBER, TCB AND DATA |
| PM POST WITH LockSN | 'h7 | BUFFER NUMBER, GENERATION COUNT, SEQUENCE NUMBER, TCB AND DATA |

FIG.7E

```
  63   59                35                              15
 | 4 h1 | RESERVED | BUFFER ADDRESS (20 BITS) | 16 h0008 |
```
PM RESET COMMAND

```
  63   59        43    35                              15
 | 4 h2 | RESERVED | GC | BUFFER ADDRESS (20 BITS) | 16 h0010 |
                        31
 |      RESERVED       | FULL SEQUENCE NUMBER |
```
PM LOCK SN COMMAND

```
  63   59      51          35                            15
 | 4 h4 | RESERVED | PURGE LENGTH | BUFFER ADDRESS (20 BITS) | 16 h0008 |
```
PM PURGE COMMAND

```
  63   59        43    35                              15
 | 4 h3 | RESERVED | GC | BUFFER ADDRESS (20 BITS) | 16 h0008 |
```
PM READ COMMAND

FIG.7F-1

| 63 | 59 | 35 | 15 |
|---|---|---|---|
| 4 | h6 | SEQUENCE NUMBER [23:0] | BUFFER ADDRESS (20 BITS) | 16 h0088 + DATA |

| | 39 | 31 | |
|---|---|---|---|
| RESERVED | GC | FULL SEQUENCE NUMBER |
| TCB (128 BYTES) |
| DATA (UP TO BUFFER SIZE) |

PM POST COMMAND

| 63 | 59 | 35 | 15 |
|---|---|---|---|
| 4 | h5 | SEQUENCE NUMBER [23:0] | BUFFER ADDRESS (20 BITS) | 16 h0088 + DATA |

| | 39 | 31 | |
|---|---|---|---|
| RESERVED | GC | FULL SEQUENCE NUMBER |
| TCB (128 BYTES) |
| DATA (UP TO BUFFER SIZE) |

PM POST WITH DEFERRED ACK COMMAND

| 63 | 59 | 35 | 15 |
|---|---|---|---|
| 4 | h7 | SEQUENCE NUMBER [23:0] | BUFFER ADDRESS (20 BITS) | 16 h0088 + DATA |

| | 39 | 31 | |
|---|---|---|---|
| RESERVED | GC | FULL SEQUENCE NUMBER |
| TCB (128 BYTES) |
| DATA (UP TO BUFFER SIZE) |

PM POST WITH LOCK SN COMMAND

FIG.7F-2

METHOD AND SYSTEM FOR MAINTAINING TEMPORAL CONSISTENCY OF RESOURCES AND DATA IN A MULTIPLE-PROCESSOR PACKET SWITCH

RELATED APPLICATIONS

This application is related to U.S. Provisional Application No. 60/355,922, entitled "Network Switch"; U.S. patent application Ser. No. 10/073,483, entitled "Method Of And System For Allocating Resources To Resource Requests Based On Application Of Persistence Policies"; U.S. patent application Ser. No. 10/074,462, entitled "Method Of And System For Allocating Resources To Resource Requests"; U.S. patent application Ser. No. 10/073,638 entitled "Method And System For Managing Traffic In A Packet Network Environment"; U.S. patent application Ser. No. 10/073,484 "Method And System For Translating Packet Sizes In A Network"; and U.S. patent application Ser. No. 10/098,957 entitled "Switching System." Each of the foregoing applications is filed concurrently herewith, and owned in common by the assignee hereof. Moroever, each of these applications is fully incorporated herein by reference as though set forth in full.

BACKGROUND OF THE INVENTION

1. Field of the Invention

The present invention generally relates to multiple-processor systems, and more particularly, to a packet switch, having multiple processing engines, for transferring information between hosts in a network environment.

2. Related Art

Packet switches are devices that are commonly found in networks. In general, a network packet switch takes ingress packet traffic, classifies such traffic, performs rewrites of packet header and data information, and then forwards that traffic to another device or host on the network.

The operation of packet switches can be described using layered protocol models. As is well known, most networked computer communication is defined with the aid of layered reference models for depicting the movement of information between host computers connected to the network. The layers in the reference models help to segregate information and network functions into manageable units. The general functions of each layer are often based on an international standard called Open System Interconnection (OSI). OSI sets forth seven processing layers through which information may pass when received by a host in order to be presentable to a non-user. Similarly, transmission of information from a host to the network may pass through those seven processing layers in reverse order. Another layered reference model that is widely implemented is called TCP/IP (Transmission Control Protocol/Internet Protocol).

To improve the performance of a network switch, a multi-processor architecture can be employed to carry out the networking functions of the switch. In such an architecture, switch functionality is distributed among multiple processing engines, which operate on packet traffic in a parallel or pipelined fashion. This generally improves the overall throughput and performance of the switch. However, in this processing arrangement, there needs to be a mechanism for coordinating the operations of the processing engines so that shared resources are efficiently used and temporal consistency is maintained for packets moving through the switch.

SUMMARY OF THE INVENTION

It is an advantage of the present invention to provide a method and apparatus for managing resources and data flows within a networked switch having a distributed processing architecture. It is a further advantage of the invention to provide a mechanism for maintaining the temporal consistency of data and distributed resources allocated to connections being handled by the switch.

According to an embodiment of the invention, a packet network switch includes a first processing engine and a second processing engine. The first processing engine assigns a semaphore to one or more packets associated with a network connection handled by the switch. The second processing engine includes a memory for storing the semaphore and an interface for receiving an internal message including a semaphore value. Internal messages are generated within the switch to control and initiate various distributed processor operations relating to the packets. The second processing engine processes the packets based on a comparison of the stored semaphore and the semaphore value. If the semaphores match, then the second processing engine normally processes the packets. Otherwise, a temporal inconsistency is indicated by the semaphore mismatch, and the second engine can generate an exception response to the internal message.

According to another embodiment of the invention, a method is provided for processing a packet received by a network switch having a plurality of processors. In this method, an origination processor assigns a semaphore to an internal message associated with the packet. The internal message is then passed to another one of the processors. Processing operations are performed at one or more of the other processors based on contents of the internal message. After this, a response including the semaphore is returned to the origination processor. The returned semaphore indicates that the processing operations at the other processors have successfully completed. This method of providing a round-trip semaphore, passed among the processors until the processing is complete, allows data and shared resources to be committed to specific connections so that consistency is maintained in temporal space.

In accordance with a further embodiment of the invention, a method is provided for coordinating the operation of the processing engines within a network switch. In this method, a request for a connection is received at the network switch. A semaphore is assigned to the connection. The semaphore can be distributed to and stored at each of the processing engines. At one of the processing engines, an internal message including a semaphore value is received. The stored semaphore is compared to the semaphore value of the message. Based on this comparison, the processing engine can perform operations relating to packets associated with the connection.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 7a–f are examples of internal message formats usable within the switch of FIG. 4.

DETAILED DESCRIPTION

The following detailed description is not meant to limit the scope of the invention, but is instead provides examples of packet switching systems and methods that more fully illustrate the principles of the invention.

Figure 1:
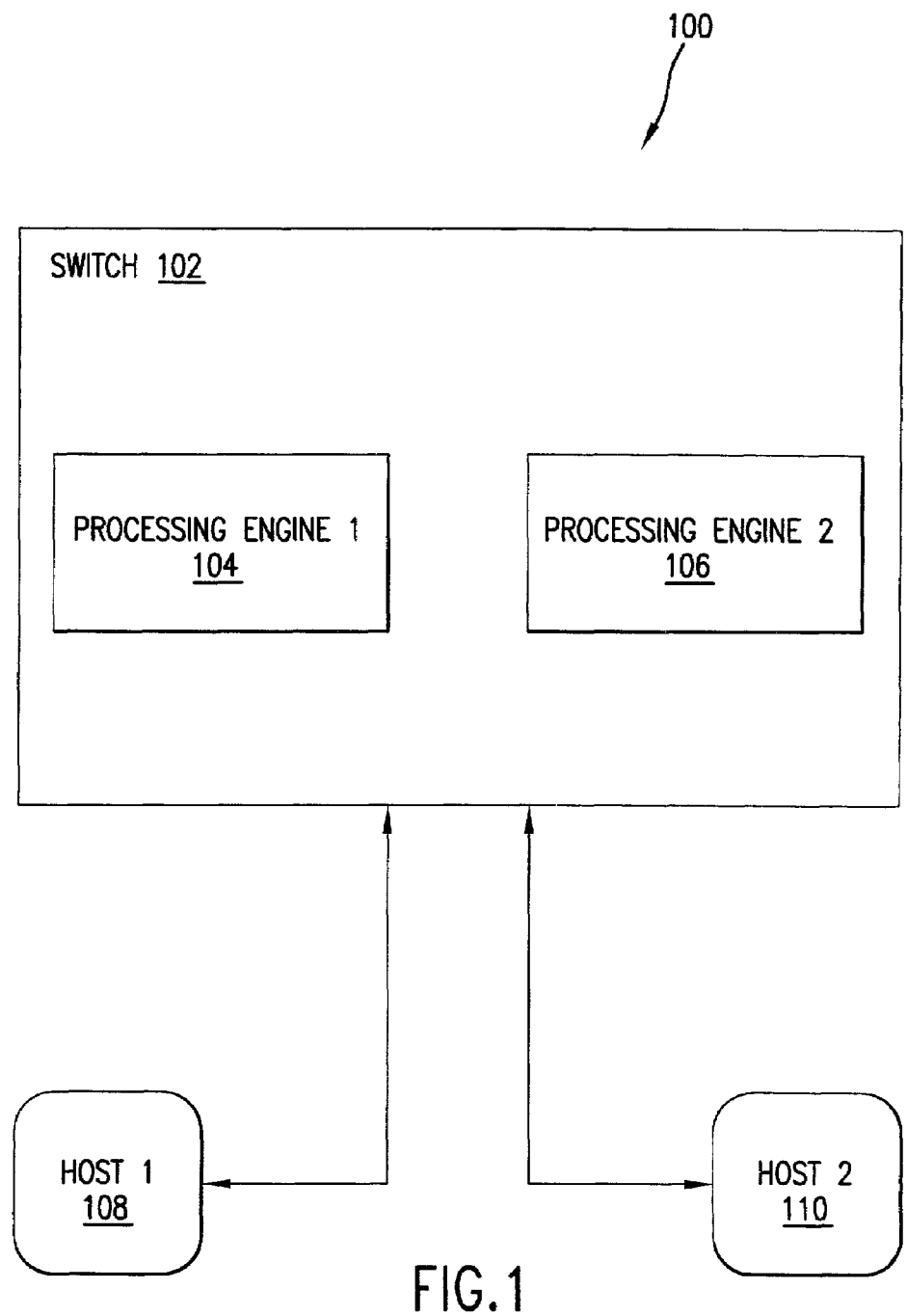
FIG. 1 is a block diagram illustrating an exemplary system in accordance with an embodiment of the present invention.

Turning now to the drawings, and in particular to FIG. 1, there is illustrated a system 100 in accordance with an exemplary embodiment of the present invention. The system 100 includes a switch 102 connected to one or more hosts 108, 110, such as clients and/or servers located on a network. The switch 102 allows the hosts 108,110 to communicate with one another using a packet-based communication protocol, such as TCP/IP.

Included in the switch 102 are two or more processing engines 104, 106 for processing packet traffic entering the switch 102. In this example, only two processing engines 104,106 are shown for illustration purposes, although the switch 102 can include more than two engines. The processing engines 104, 105 provide a multi-processor architecture within the switch 102 for performing parallel and/or pipelined operations relating to packet processing.

Generally, the switch 102 receives incoming packets from the hosts 108, 110 and synthesizes output packets that have been formatted to improve throughput and overall system performance. In particular, the switch 102 can perform processing functions such as those described in the related application entitled "Packet Switch System", which is hereby incorporated by reference.

The network switch 102 is configured to ensure temporal consistency of data and resources as packet traffic flows through the switch 102. Temporal consistency is important in some networking environments, such as TCP/IP. In TCP/IP, connections to a particular socket can be added or dropped while the switch 102 is still processing packets related to a previous connection to the same socket. Temporal consistency ensures that switch resources and packets associated with the first connection are not confused with packets and resources corresponding to later connections.

As an illustration of an example of consistency in temporal space, in one scenario, a packet originator at time 1 assigns a semaphore, processor 1 acts on the semaphore at time 2 and so on, by processor n at time n. However, input packets and/or data are being received by the switch while the semaphore is traversing the system. The information in various processors that the semaphore effects are lock-in-step with each other such that they have the same behavior as if being done at the same time, even though they were acted on at different times.

Figure 2:
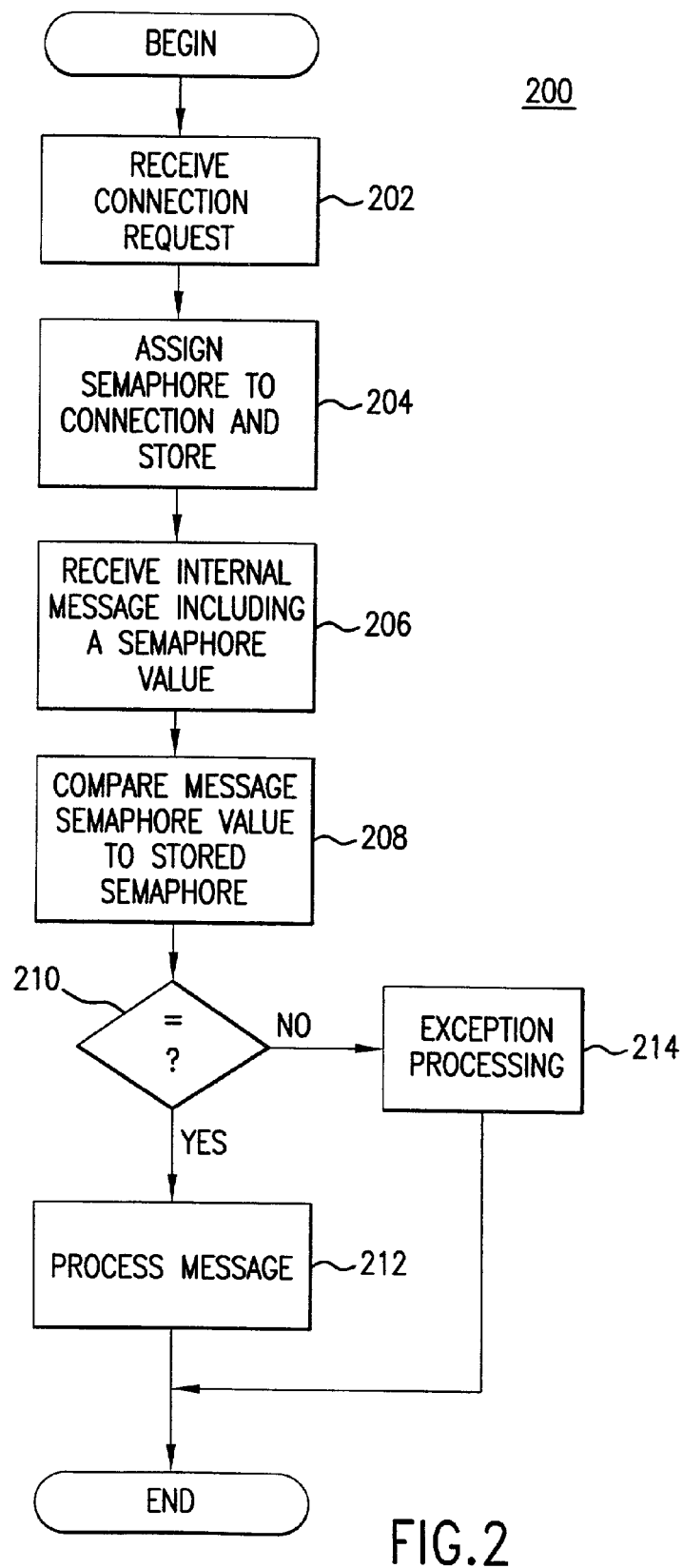
FIG. 2 is a flowchart illustrating a method of semaphore handling within the system of FIG. 1.

FIG. 2 shows a flowchart 200 of a method of using semaphores to maintain temporal consistency within the switch 102, in accordance with an embodiment of the invention.

Upon receiving a connection request (step 202), the switch 102 internally associates a semaphore with the connection (step 204). The first processing engine 104 can assign a semaphore to one or more packets associated with the network connection. The semaphore is distributed and stored at the processing engines 105,106.

Each of the processing engines 104, 106 performs specific operations relating to incoming packets associated with the connection. Internal messages are passed between the processing engines 104,106 to coordinate and control these operations. Some of these messages can include a semaphore value. Upon receiving such a message (step 206), a processing engine compares the semaphore value to the stored semaphore (step 208). In step 210, a check is made to determine whether the semaphores match. If the semaphores match, then the receiving processing engine normally processes the packets (step 212). Otherwise, a temporal inconsistency is indicated by the semaphore mismatch, and the engine can generate an exception response to the internal message (step 214).

Figure 3:
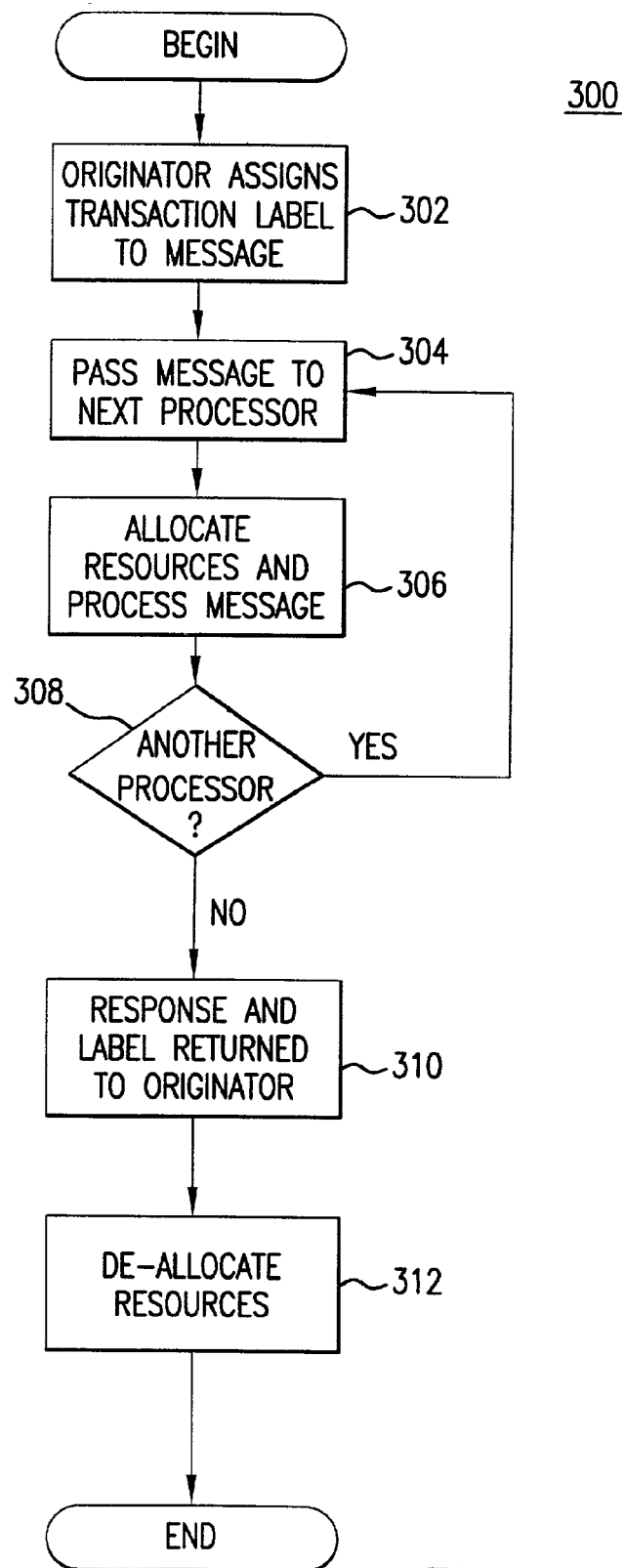
FIG. 3 is a flowchart illustrating a method coordinating operations of the processors included in the system of FIG. 1.

FIG. 3 is a flowchart 300 illustrating an alternative/additional method of coordinating operations of the processors 104,106 included in the system 102 of FIG. 1. In this method a "round-trip" semaphore (transaction label) is passed among the processors 104,106 until the packet processing is complete. This allows data and shared resources to be committed to specific connections so that consistency is maintained in temporal space.

In step 302, an origination processor (e.g. processing engine 104) assigns a semaphore to an internal message associated with a packet being processed by the switch 102. In step 304, the internal message is then passed to the second processing engine 106. In step 306, resources, such as memory buffers, pointers, and the like, are allocated and processing operations are performed at the second processor 106 based on the contents of the internal message. After this, a check is made to determine whether the packet is to be processed by another processor (step 308). If so, process returns to step 304 and a message including the label is forwarded to the next processor.

If no further processing is needed, a response including the semaphore (label) is returned to the origination processor (step 310). The returned semaphore indicates that the processing operations at the other processors have successfully completed. Processor resources committed to the packet and/or connection can then be de-allocated and re-used for other packets (step 312).

Figure 4:
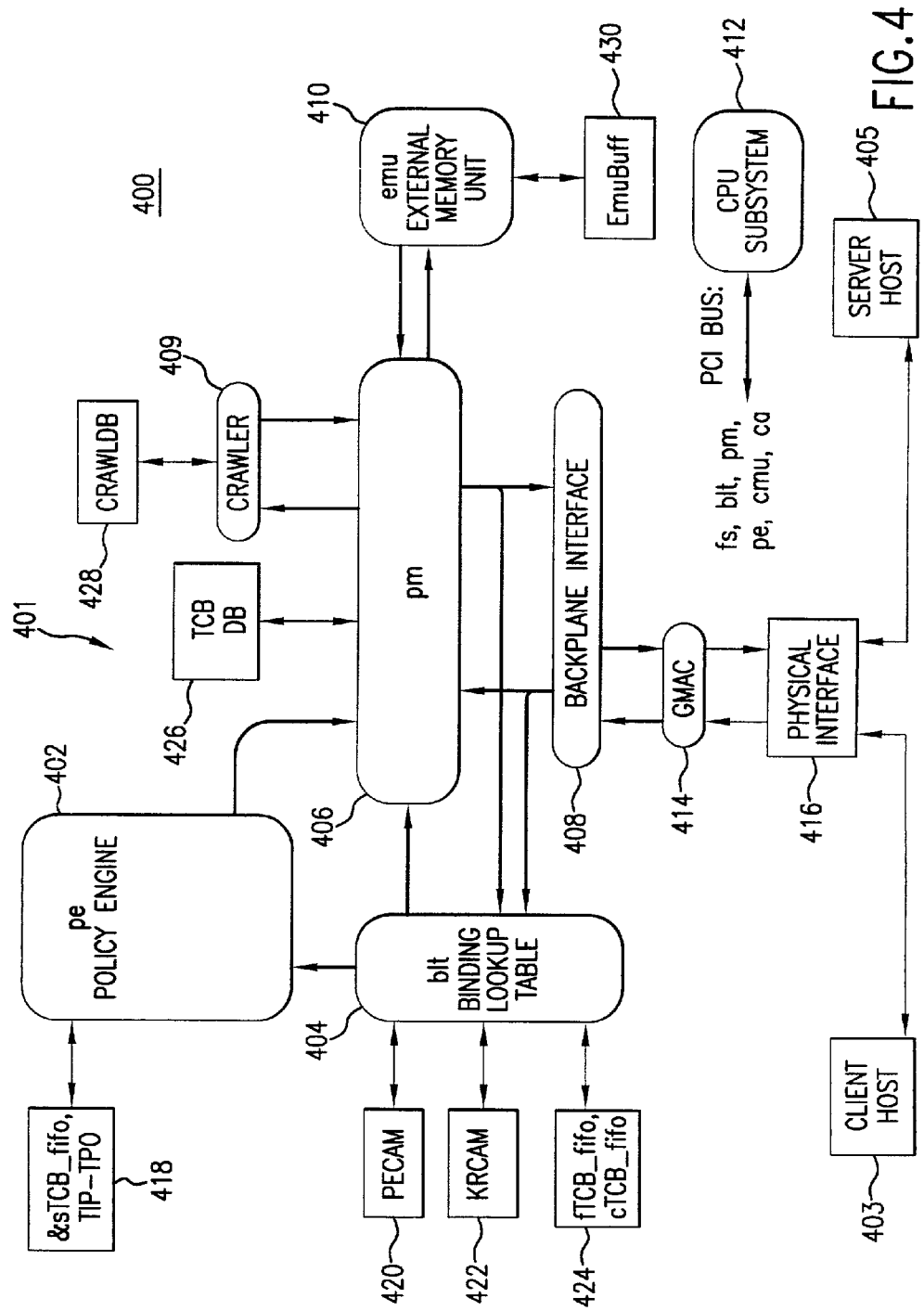
FIG. 4 is block diagram of an exemplary system in accordance with another embodiment of the present invention.

FIG. 4 is block diagram of an exemplary system 400 in accordance with a further embodiment of the present invention. The system 400 includes a switch 401 connected to one or more client hosts 403 and one or more server hosts 405, such as computers. The switch 401 allows the client 403 and server 405 to communicate with one another using a packet-based communication protocol, such as TCP/IP.

The processing engines included in the switch 401 use internal messages to pass semaphores, e.g. a generation count and transaction label (tlabel), among themselves to coordinate operations and maintain temporal consistency for connections handled by the switch 401.

Generally, the packet switch 401 takes ingress traffic, classifies such traffic, performs rewrites, and then forwards that traffic. Similarly, packets are directed to the switch 401 by packet filters or forwarding entries configured into a host switch (not shown) with respect to virtual IP (VIP) addresses allocated to the switch 401. Traffic from the host switch arrives at the packet switch 401, is classified according to headers and content policies, undergoes rewrites by way of header construction, and then egresses back through the host switch.

The switch 401 architecture addresses layer 4 (L4)–layer 7 (L7) networking services, as referenced to the OSI seven layer model. These services can include services such as content-enabled server load-balancing (SLB) at gigabit Ethernet media rates. While emphasis is on content services, support is also provided for L4 (non-content) services, including SLB, at the same media rates.

The switch 401 can operate as a reverse-proxy between clients and servers, thus it can terminate both client-side and server-side TCP connections. The switch 401 can be implemented in the form of an intelligent processing card, which can be deployed as an appliance or as a blade in a gigabit Ethernet chassis switch (not shown).

The switch 401 is configured with forwarding data so that egress server traffic can reach the appropriate physical server hosts. Console and data access can be provided through administrative serial and Ethernet ports (not shown) included in the switch 401. These can be used for configuration and status reports.

The switch 401 includes a policy engine (PE) 402, a binding lookup table (BLT) 404, a packet manager (PM) 406, a backplane interface 408, a crawler 409, an external memory unit (EMU) 410, a central processing unit (CPU) subsystem 412, a gigabit media access controller (GMAC) 414, and a physical interface 416. The switch 401 also includes a number of storage devices. Theses devices include one or more first-in-first-out (FIFO) memories 418 for storing server transmission control block (sTCB) pointers and switch internet protocol (IP) addresses (TIPs) and TCP port numbers (TPOs), a policy engine content addressable memory (PECAM) 420, a key reduction CAM (KRCAM) 422, one or more FIFOs 424 for storing flow TCB (fTCB) pointers and client (cTCB) pointers, a TCB database (DB) 426, a crawler database 428, and an EMU buffer 430.

The storage devices 418–430 are generally depicted in their preferred technologies in FIG. 4. However, alternative memory technologies, such as EEPROMs, RAMs, optical storage devices, or any other suitable storage means can be used to implement the storage devices 418–430.

The policy engine 402, BLT 404, packet manager 408, backplane interface 408, crawler 409, and EMU 410 can be implemented using any suitable combination of hardware and/or software components, and are preferably implemented in hardware using one or more field programmable gate arrays (FPGAs), such as part number EP-20K, available from Altera, Inc. In addition or in the alternative, the above components can be implemented using one or more application specific integrated circuits (ASICs) or application specific standard products (ASSPs).

The functionality of the packet switch 401 is comprised of two partitions: a simplified TCP/IP stack for packet handling and traffic management, and a proxy service for content analysis and policy selection. This functionality can be thought of as a protocol stack and an application running over that stack.

The TCP/IP protocol stack functionality is comprised of the backplane interface 408 for ingress packet pre-filtering and header classification, the BLT 404, which provides a traffic stream flow table, the PM 406, which includes a TCP/IP protocol state machine and rewrite engine, and the EMU 410, which provides a protocol reassembly manager and preliminary parser.

The proxy service partition includes the PE 402, which provides a server load-balancing policy engine and related scheduling and server tables.

The GMAC 414 and physical interface 416 include commercially-available components for implementing media access control (MAC) and physical layer protocols, such as gigabit Ethernet, for communicating with the hosts 403, 405 over a network. Two physical interfaces can be supported. The first is a 1000 BaseT copper interface, which connects to the physical interface 416. The full line rate is supported. The second interface is a backplane interface. This interface is full duplex and supports 1000 BaseT both into and out of the GMAC 414. If the packet switch 401 is deployed in a host switch then the backplane interface can be active. If the switch 401 is deployed as an appliance, then the CAT5 interface is active.

In addition to or alternatively, the physical interface can include components for interfacing to an optical network.

In addition to its functions described above, the backplane interface 408 can, based on protocol, channel incoming packets to the CPU 412. During normal operation only control packets are channeled to the CPU 412. The backplane interface 408 accepts outgoing packets from the CPU 412 or from the PM 406. In addition, packets may be transferred by direct memory access (DMA) directly from the CPU 412 subsystem. The backplane interface 408 also translates each packet from the internal formats used in switch 401 to the format used by the GMAC 414.

The CPU subsystem 412 can include a conventional complement of devices (CPU, RAM, ROM, Flash, etc). It communicates with the other components in the switch 401 through a 32 bit/50 MHz PCI interface. The primary interface to the user is the RS232, which supports a user console (not shown). The CPU card handles functions such as diagnostics, health checks, configuration and initialization of the switch 401, and the like.

The BLT 404 maintains a list of open TCP logical connections in the KRCAM 422. The key to the CAM 422 is a five-tuple extracted from incoming IP packets. The five-tuple includes the source IP address, destination IP address, source TCP port, destination TCP port, and IP protocol field. As packets pass from the backplane interface 408 to the PM 406, they are examined by the BLT 404 and the five-tuple is extracted. The five-tuple is then applied to the KRCAM 422. The contents of the KRCAM 422 includes fTCB pointers to TCB data structures, which describe the state of the TCP connection. If the packet five-tuple hits, i.e., refers to an existing connection, then a TCB pointer from the KRCAM 422 is passed to the PM 406 so that the corresponding TCB can be accessed in the TCB database 426 during handling of the packet.

The cTCB and FTCB pointers, which are not currently in use are stored in the two FIFOs 424. These FIFOs are pre-loaded by the CPU 412 at boot time. The number of supported key-address pairs in the CAM is total number of connections supported by the switch 401.

In addition to the 24-bit TCB pointers, the FIFO RAM holds an additional 8-bit generation count (GEN CNT) field in the high order byte of each FIFO entry. The GEN CNT is a semaphore passed forward to both the PE 402 and the PM 406 for use in other blocks. It is incremented every time the TCB pointer is recycled back into the FIFO 424 (rolling over after 256 recycles). This allows the BLT 404 to recycle the pointers into the appropriate resource pool when the PM 406 is tearing down a connection (doing DELETE requests).

As connections are torn down or timed out by the PM 406, the associated TCB pointers are removed from the key reduction CAM 422. The TCB pointers are recycled by putting them back into the appropriate FIFO. Server TCB pointers are forwarded to the PE 402, which manages the pool of available sTCB indexes (pointers).

The purpose of the crawler 409 is to determine whether a specified time period has elapsed since the last activity seen on a connection. An activity can include a previous timeout detected by the crawler.

To accomplish this function, there is a separate crawler entry for each server TCB and for each client TCB in the crawler database 428. A state machine continually walks through the crawler DB 428 and examines each crawler entry to determine whether a the timeout period has elapsed (i.e., it times out the connection).

There can be a predetermined number of timeout intervals supported by the crawler 410. These values can be stored in registers that are set by the CPU 412 at configuration time. If a new crawler entry is updated before the timeout period expires, then the entry is overwritten and any evidence of the previous values is discarded.

There are two interfaces between the PM 406 and the crawler 409. The first is a command interface, which the PM 406 uses to directly read or write the crawler entries. This is the interface used to instruct the crawler 409 to perform its timeout function on a specific client or server TCB. The second interface is a FIFO, which the crawler 409 uses to notify the PM 406 that a specified timeout period has elapsed for a specified TCB. The commands, which are accepted by the crawler 409 are shown in the table below:

Init Marks a crawler entry as valid. This command also specifies which timeout interval should be used for the timeout function.
Get Returns the current contents of the crawler entry to the PM 406 via the command interface.
Update The difference between an update and an init is that the crawler uses the control bits in the crawler entry (as opposed to initializing them).
Delete This marks the crawler entry as invalid. When the crawler state machine next encounters this entry it will notify the PM 406 and the PM 406 will invalidate the corresponding TCB entry.

If the crawler times out a connection it uses the FIFO interface to send a marker to the PM 406. The marker indicates which type of timeout period was selected and which TCB timed out. However, it is possible that when the timeout is detected, the FIFO from the crawler 409 to the PM 406 is full. In this case the crawler state machine will wait until its next pass through the crawler memory 428 to deposit the timeout. State is kept in the crawler 410 to indicate that the timeout already occurred.

Anytime that an L5 packet is handled and the TCB is fetched, the corresponding crawler entry is fetched. At the same time, the crawler state machine continues to walk through memory 428. Once a crawler entry has been read by the PM 406, the crawler state machine is prevented from updating that entry and from placing any timeout indicator associated with that entry in the crawler 109 to the PM 406 FIFO. Thus, the PM 406 can know that the entry, which it read, is valid until it is written back to crawler memory. This eliminates situations involving the timeout of a connection while a packet is being handled. During this time, other crawler entries are examined and timeouts that are associated with other entries may be written to the crawler 410 and to the PM 406 FIFO.

In operation, the switch 401 receives ingress traffic that is delivered from the host switch to the backplane interface 408, where such traffic is exposed to basic sanity checks and header classifications. Most incoming traffic is forwarded to the PM 406 for TCP/IP protocol processing. In transit to the PM 406, traffic headers are snooped by BLT 404 to provide lookup indexes, which include TCB references and service indexes. Any traffic referencing a non-content-enabled service can be signaled to the policy engine 402 to get a server binding.

Client traffic arriving at the TCP/IP stack is initially classified as to which service is being requested (service index) and who is making the request (client identifier). For L4 situations, these values are used directly in the proxy service for policy considerations. For L5–7(content-enabled) services, these initial values are qualified inside the proxy service according to configured content rules, and a final set of values is computed and used for policy considerations.

At the PM 406, a packet header is presented to the protocol state machine against the state given in the corresponding TCB that was identified by BLT 404. Relevant data is extracted from the packet header and applied to the TCB and then the header is stripped from the packet. A header rewrite is achieved by regenerating it on the egress side of the PM 406 from the corresponding TCB. If any content inspection is necessary, the packet body is forwarded to EMU 410 for reassembly and eventual presentation to the proxy service. In such cases, the packet body is not transmitted out of the switch 401 until a server binding has been made.

If a policy selection is necessary (e.g. for the head of a new traffic flow) the PM 406 is notified by the proxy service. The request to the proxy service is generated by the BLT 404 for L4 services, and the EMU 410 for L5–L7 services.

The EMU 410 reassembles a TCP data stream and determines if there is sufficient data to present to the proxy service for content analysis and policy selection. To do this it ensures that the data is contiguous and without gaps, that the start of the data is aligned with the expected TCP sequence number, and that certain keyword-value pairs (kv-pairs) are present.

During typical operation, the PM 406 posts one or more message segments to the EMU 410 and receives a deferred acknowledgment, if one was requested. Upon detection of a completed header, the PM 406 requests the header from EMU and sends it to the correct server. When an acknowledgment is received, the PM 406 instructs EMU 410 to purge the header and the cycle repeats. As shown in FIG. 7e, the PM messages to the EMU 410 begin with a 4-bit command, the buffer address, the post sequence number and the length of the message header and data. In response to these messages, the EMU starts memory reads from the summary data of the specified buffer.

The EMU 410 processes deferred packet events. When a deferred event is processed, the TCB is retrieved from memory and validated by checking the generation count. This prevents a deferred event whose connection has been reset from completing.

The EMU buffer 430 contents are presented to the policy service once required kv-pairs are present, or when the buffer 430 is completely filled. To support TCP acknowledge (ACK) generation, the EMU 410 also provides feedback to the PM 406 about gaps in the received data buffer.

The buffer 430 includes a summary area for each connection handled by the switch 401. Each summary area consists of a length rewrite field, a buffer control field and a contiguity bit field. The length rewrite field is a fast-rewrite field containing the length of the payload associated with the current header, a valid bit indicating if a payload was present in the header and a generation count obtained from the TCB storage at the time the length was identified. The generation count prevents any problems arising from connections that are reset while a data post to PM 406 is in progress.

The generation count is associated with a connection. Because events processed by the EMU 410 are deferred, it is possible that a deferred event queue entry exists for a buffer, which has been reset and may contain new data. The PM 406 increments the generation count for every new connection. When deferred events are extracted by either event processor, the generation count is checked against the current generation count in the buffer. Events for buffers, which no longer are valid are dropped.

The PE 402 accepts service index and client identifier values from the BLT 404 (for L4) and applies the service policies. For SLB, this involves establishing the physical server binding according to these general rules:
 a) check client history for similar requests from the same client; apply any such discovered binding (for stickiness), and
 b) apply scheduling rules for the appropriate server grouping to select and bind a physical server.

The PE 402 adjusts server usage counts and informs the protocol stack of the PM 406 of the server selection. The PM 406 can then forward the saved TCP data in EMU 410 to the selected server If the packet passed from backplane interface 408 to the PM 406 is associated with a new connection, then there will be no entry in the KRCAM 422. In this case, the BLT 404 references the PECAM 420 with a three-tuple extracted from the packet as it passes between the PM 406 and the backplane 408. The three-tuple includes the destination IP address, destination port, and IP protocol field. The output of the PECAM 420 is a service index used to determine:
 a) whether this new connection can be supported by the proxy;
 b) whether the connection is requesting an L4 (non-content aware) or L5 (content aware) service; and
 c) which particular service is being requested by the packet.

If the client is requesting a supported service, a new pointer to a TCB (L4 or L5) is popped off the appropriate FIFO 424 and sent to the PM 406. In the case of an L4 connection, the information about the service requested is sent to the PE 402. If the new connection is an L5 connection all information is sent to the PM 406.

The BLT 404 can also be directed by the PM 406 to add a server→client connection to the KRCAM 422 once a connection is established. To pick up these directives, the BLT 404 snoops the bus used to send outgoing packets from the PM 406 to backplane interface 408. In this case there is no associated service information and the entry to the KRCAM 422 is a new entry.

When a connection is terminated the BLT 404 is informed by the PM 406. As with the server→client adds, these directives are snooped on the outgoing PM to backplane interface bus. When the BLT 404 is notified of a connection termination, it removes the corresponding KRCAM entry and returns the TCB pointer to the appropriate FIFO (L4 or L5).

The policy engine 402 receives L4 service requests from the BLT 404. The server description and proxy TIP/TPO databases provide the five-tuple associated with the proxy to server connection (Source Internet Protocol (IP) Address, Destination IP Address, Source Port Number, Destination Port Number, Protocol). If the connection is L5, then a pointer to a server TCB (sTBC) is allocated from the sTCB FIFO 418. This points to the TCB data structure stored in the TCB database that describes the server to client connection.

Figure 5:
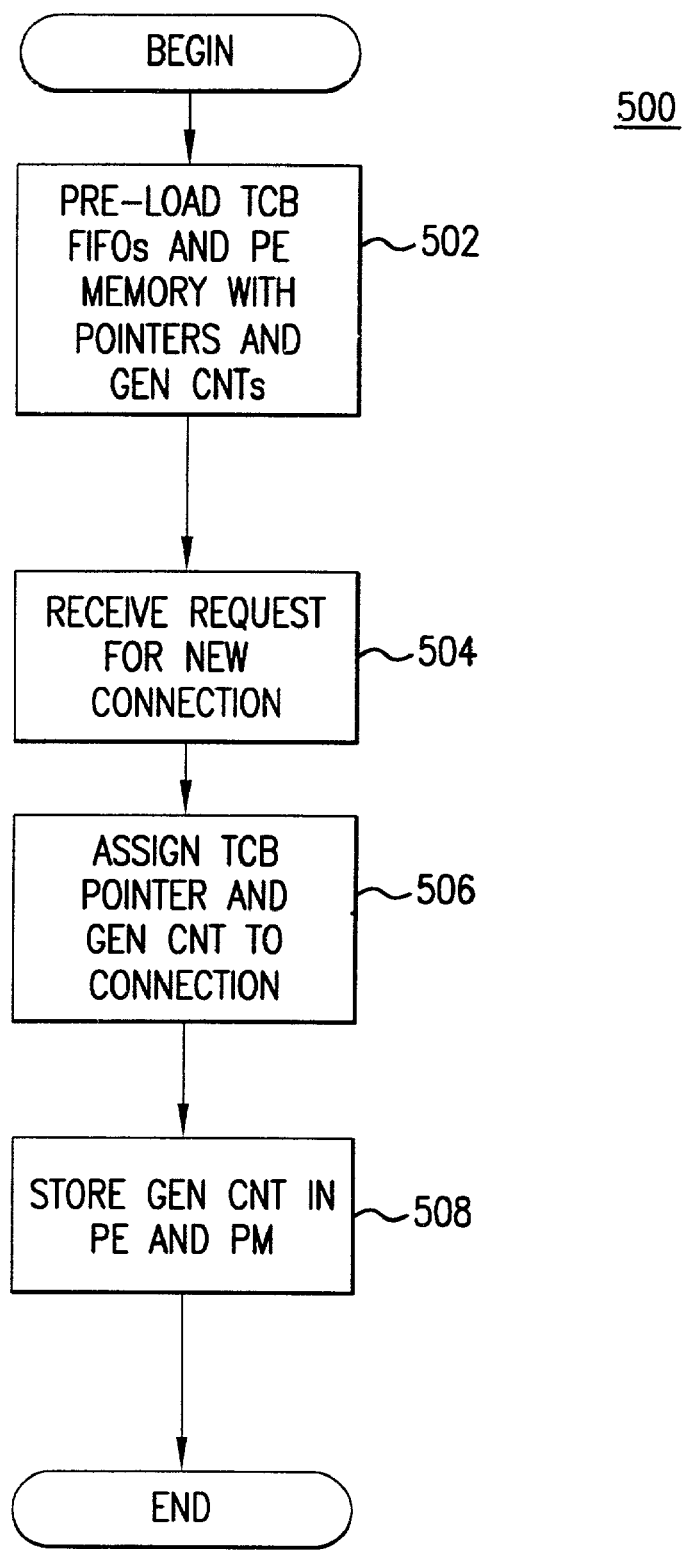
FIG. 5 is a flowchart illustrating a method managing semaphores for new connections received by the system of FIG. 4.

FIG. 5 is a flowchart 500 illustrating a method managing semaphores for new connections received by the switch 401 of FIG. 4. In step 502, the CPU 412 pre-loads the TCB and PE FIFOs 424,418 with respective TCB pointers and corresponding generation count (GEN CNT) semaphores.

In step 504, a request for a new connection is received by the switch 401. The BLT 404 snoops the connection request packet as it is passed from the backplane interface 408 to the PM 406. Upon determining that it is dealing with a new connections, the BLT 404, or the PE 402 in conjunction with the BLT 402, assigns a TCB pointer and GEN CNT to the connection (step 506).

Using internal messaging, formatted as shown in FIGS. 7*a*–*f*, the GEN CNT for the connection is distributed to the PE 402, PM 406, and EMU 410 where it is stored (step 508). The BLT 404 and PM 406 maintain an independent generation count for each TCB in its database. When initializing the TCB data structure, the PM 406 verifies that the generation count associated with the fTCB and sTCB pointers sent from BLT 404 and PE 402 match the value in its own stored generation count stored in the TCB database.

Figure 6:
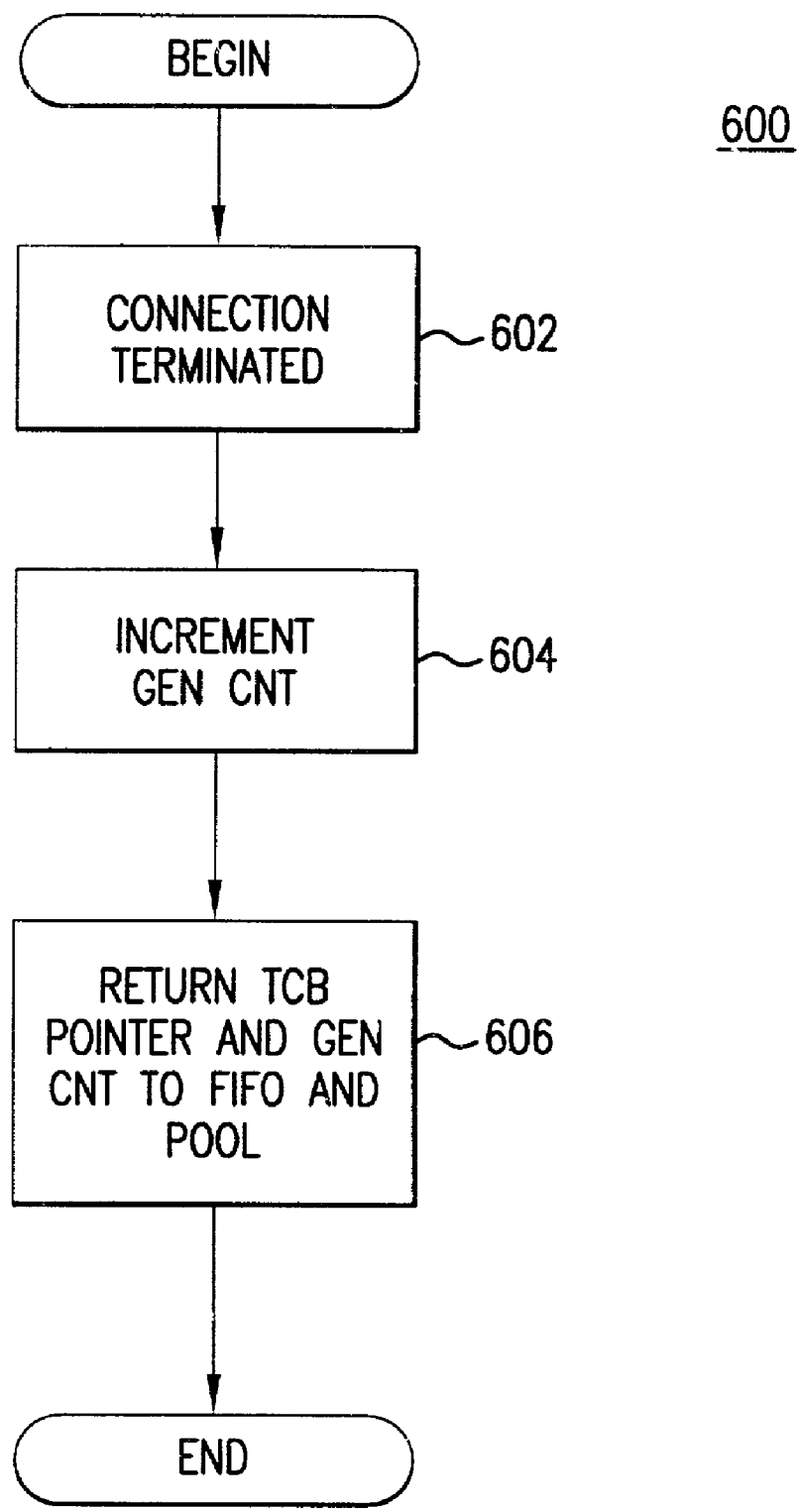
FIG. 6 is a flowchart illustrating an exemplary method of recycling semaphores in the system of FIG. 4.

FIG. 6 is a flowchart 600 illustrating a method recycling GEN CNT semaphores in the switch 401 of FIG. 4. In step 602, a connection is terminated. In step 604, the BLT 404 increments the GEN CNT value. In step 606, the TCB pointer associated with the connection and the incremented GEN CNT semaphore are returned to the respective FIFO 418,424.

FIGS. 7*a*–*f* are examples of internal message formats usable within the switch of FIG. 4.

FIG. 7*a* illustrates the format of messages passed from the BLT 404 to the PM 406. Data transmissions from the BLT to the PM 406 consist of two 32-bit data words. Every time a packet arrives at the BLT 404, it generates some TCB pointer to send to the PM 406. The pointer may be a flow or client TCB pointer from a FIFO, or it may be the flow or client TCB pointer recalled from the KRCAM database for any active connection. The pointer is sent as the first data word of the message packet. The second data word of the message contains the application class and service policy index fields from the PECAM. It also contains the generation count in the highest order byte. This count is effectively the number of times that the TCB pointer has been recycled.

FIG. 7*b* illustrates the format of messages (marker packets) passed from the PM 406 to the BLT 404.

If a connection is closed by either a client or server, the TCBs are marked for deletion and the BLT and the Policy Engine are informed with marker packets via the BLT to delete the connection and update the FIFOs.

Marker packets consist of four data words, as shown. "Reserved" fields are set to logic '0'. The data fields contain a 5-tuple, associated data and a command, bracketed by start and end markers. It also includes the history pointer, service policy, server index and transaction label (all provided by the PM 406) used by Policy Engine 402. The BLT 404 buffers for later transfer the fields needed by Policy Engine 402.

An additional bit of information is included to indicate a "client flag". This is bit number 57 of the SPM (service policy marker) packet data field. When the flag is set to logic '0', the packet will be handled by recycling the indicated TCB pointer by storing it in the appropriate FIFO. The transaction label is forwarded to the Policy Engine 402. When the flag is set to logic high '1', the TCB pointers are not recycled into the FIFOs, and a "pass" indicator is forwarded to the PE 402. This scheme allows two connections (a client and a server) which are associated with the same TCB pointer to be deleted from the KRCAM without recycling the same TCB pointer twice.

FIG. 7c illustrates two different message formats passed from the BLT 404 to the PE 402. There are two types of data transmissions from the BLT to PE. When a newly established flow TCB is being sent to the PM 406, it is also sent to the PE 402 packaged with several extra pieces of information. The other type of information packet sent to the PE 402 is generated when a marker packet is completed and the transaction label (tlabel) is sent to the PE 402, causing it to clear its resources.

FIG. 7d illustrates the format of messages passed from the PE 402 to the PM 406. FIG. 7e illustrates the format of messages passed from the PM 406 to the EMU 410. FIG. 7f illustrates the formats of commands included in the message format of FIG. 7e.

Figure 8:
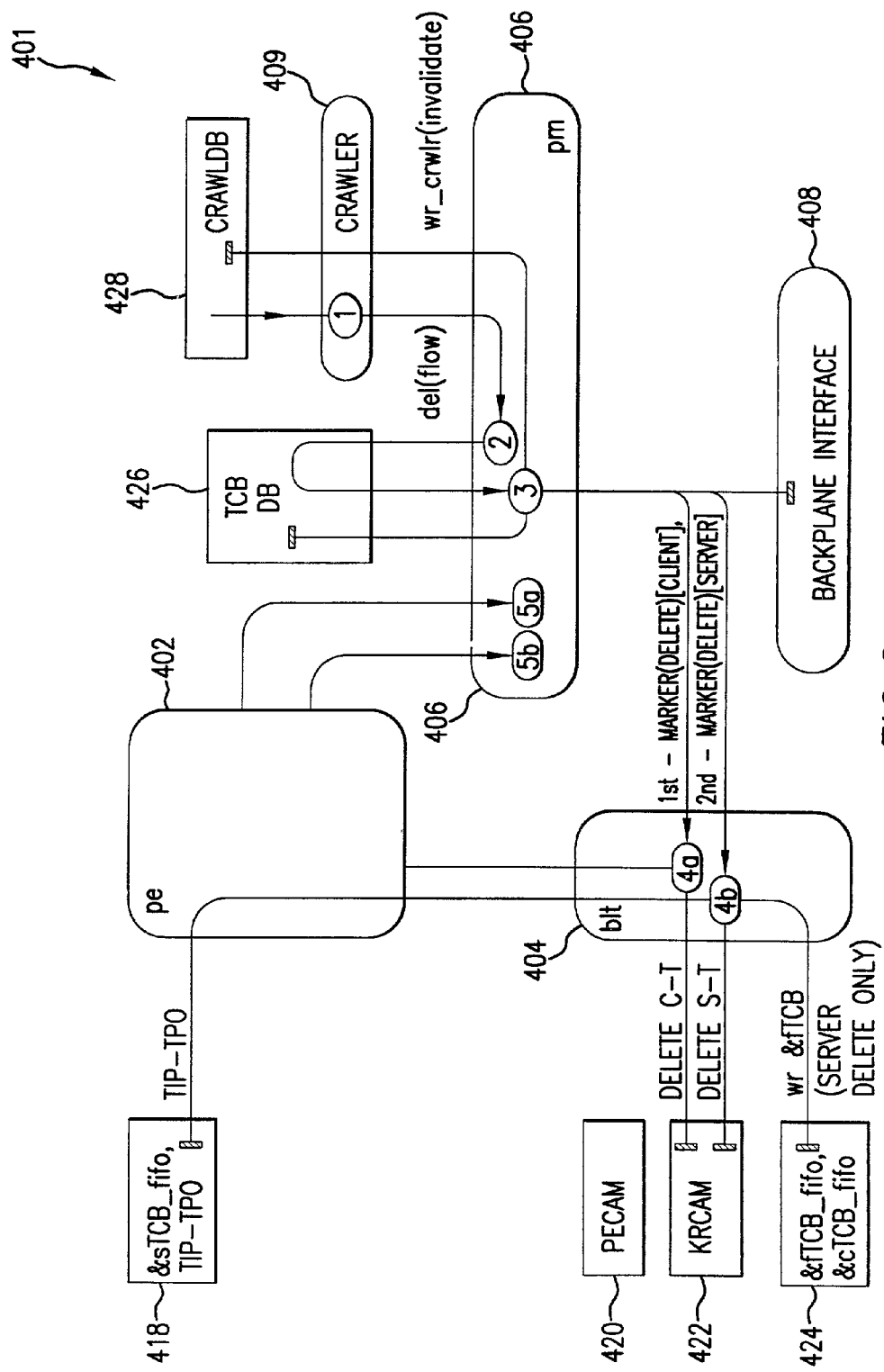
FIGS. 8–10 are process diagrams showing examples of operational scenarios for de-allocating switch resources.
Figure 9:
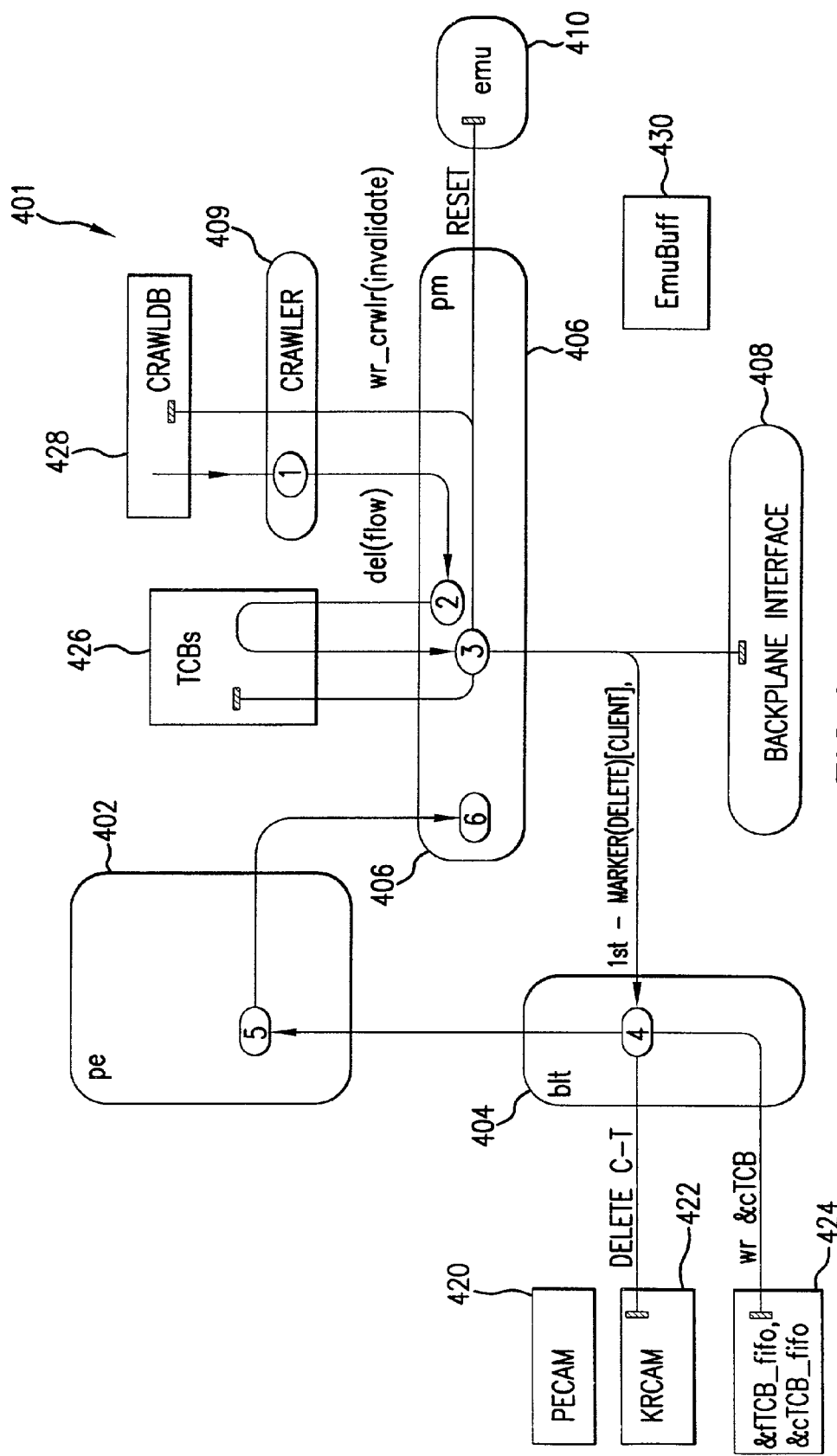
Figure 10:
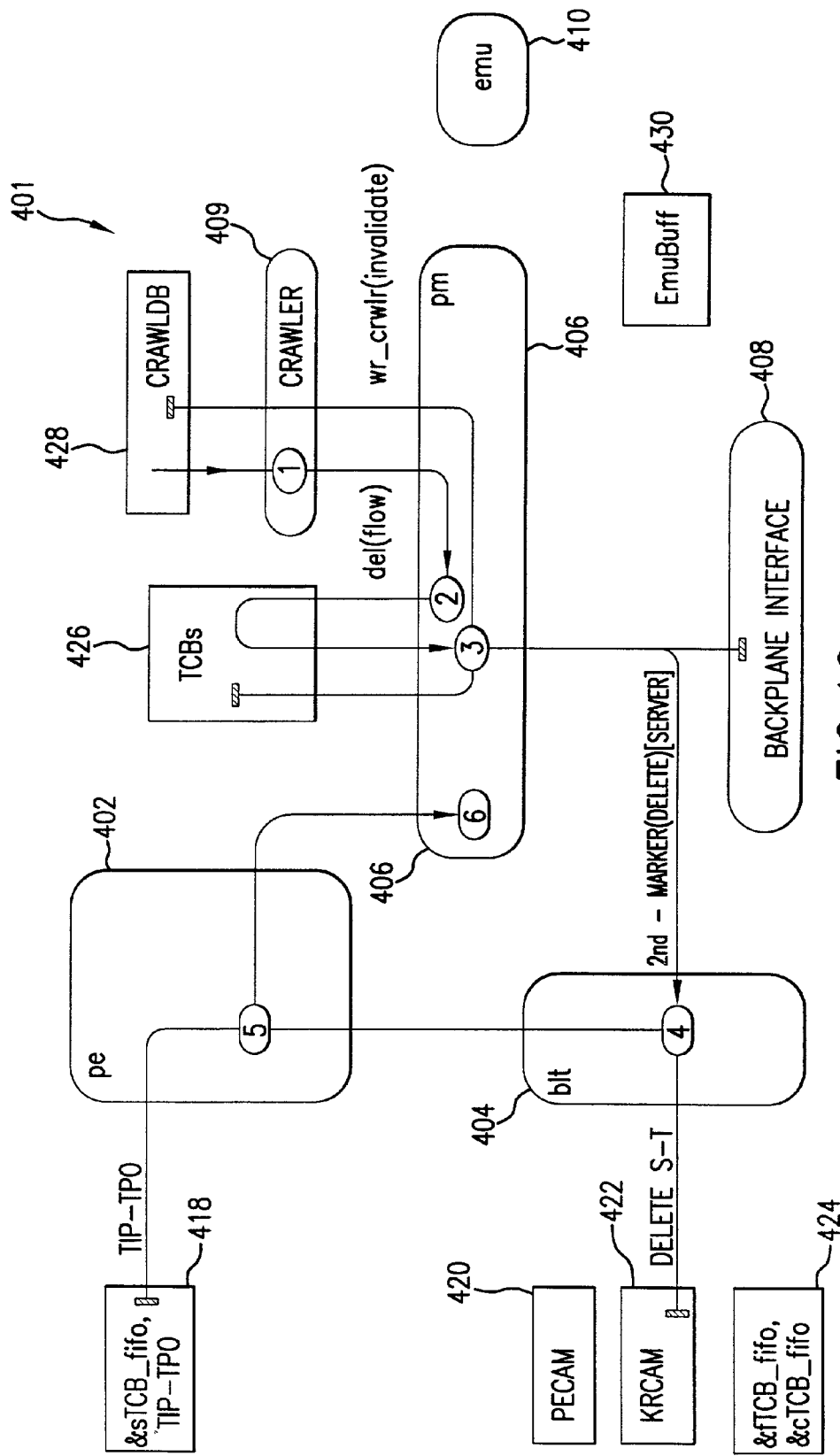

FIGS. 8–10 are process diagrams showing examples of operational scenarios for de-allocating switch resources. In each of this scenarios, the internal messages passed between the PM, PE, and BLT include a transaction label (tlabel) that serves as a round-trip semaphore, as described above in connection with FIG. 3.

Referring to FIG. 8, a process diagram is shown for reclaiming switch resources used by an L4 connection. After a connection is terminated, the crawler de-allocates switch resources assigned to the connection. For an L4 connection, the de-allocation process takes place as follows. In step (1), the crawler 428, while scanning through its database 428, determines that the "waiting period" for an L4 connection has elapsed and the associated resources should be released. It then sends a delete request to the PM 406.

In step (2), the PM 406 retrieves the corresponding TCB for the connection from the TCB database 426. This is how the fTCB and five-tuple are obtained.

In step (3), the PM 406 verifies that the connection is complete and marks the TCB as invalid. It then sends two marker (delete) packets to the BLT 404 The marker (delete) that refers to the client to switch connection is always sent first. The marker that refers to the switch to server connection follows. At the same time these markers are sent, the PM 406 invalidates the TCB and crawler entries associated with the connection.

In step (4), the BLT 404 snoops the client connection marker (delete) and extracts the five-tuple and deletes the corresponding entry in the KRCAM 422.

When the BLT 404 snoops the server connection marker (delete), it once again extracts the five-tuple and deletes the corresponding entry in the KRCAM 422. It also recycles the fTCB pointer contained in the marker(delete) packet. To do this, the BLT increments the GEN CNT and stores the GEN CNT and fTCB in the fTCB FIFO. BLT 404 then forwards each marker(delete) to PE 402.

In step (5), every delete received by the PE 402 is forwarded to the PM 406. The message format includes the tlabel semaphore (FIG. 7d) so that the originating processor (the PM 406) is informed that the PE and BLT have complete their processing functions. This allows the PM 406 to verify that the delete was seen by both the BLT 404 and the PE 402.

Referring to FIG. 9, a process diagram is shown for reclaiming switch resources of an L5 client upon connection termination. In step (1), the crawler 410, while scanning through its database 428, determines that the reclaim_now timer for a cTCB has expired. It then sends a delete request to the PM 406.

In step (2), the PM 406 retrieves the cTCB. In step (3), the PM 406 then
  a) invalidates the corresponding crawler entry,
  b) resets the EMU buffer 430 (no more read responses to the PM 406), or
  c) sends a client delete marker to the backplane interface 408.

Next, in step (4), the BLT 404 snoops the client connection marker(delete) and extracts the five-tuple and deletes the entry in the KRCAM 422. The BLT also recycles the cTCB pointer contained in the marker(delete) packet, as discussed above in connection with FIG. 8. The BLT 404 also forwards each marker(delete) to the PE 402.

In step (5), every delete received by the PE 402 is forwarded to the PM 406. As discussed above in connection with FIG. 8, the tlabel allows the PM 406 to be informed that the processing is completed within the BLT and PE. This allows the PM 406 to verify that the delete was seen by both the BLT 404 and the PE 402.

Referring to FIG. 10, a process diagram is shown for reclaiming switch resources used by an L5 server connection. In step (1), the crawler 410, while scanning through the crawler database 428, determines that the reclaim_now timer for an sTCB has expired. It then sends a delete request to the PM 406. In step (2), the PM 406 retrieves the sTCB.

In step (3), the PM 406 then sends a server delete marker to the backplane interface 408. In step (4), the PM 406 verifies that the connection is complete and marks the TCB as invalid. It then sends two marker(delete) packets to the BLT 404. The backplane interface also receives markers, but discards them. The marker(delete), which refers to the client to switch connection is always sent first. The marker which refers to the switch to server connection follows. At the same time, these markers are sent, the PM 406 invalidates the TCB and crawler entries associated with the connection.

In step (5), the BLT 404 snoops the client connection marker(delete) and extracts the five-tuple and deletes the entry in the KRCAM 422. The BLT 404 also forwards each marker(delete) to the PE 402. In step (6), when PE receives the server delete the TIP-TPO is recycled. When the switch establishes a connection to a server, it uses one of its own IP addresses. The TIP-TPO FIFO contains a pool of IP addresses and ports, each of which can be retrieved for a new switch to server connection.

In step (7), every delete received by the PE 402 is forwarded to the PM 406. This allows the PM 406 to verify that the delete was seen by both the BLT 404 and the PE 402.

While various embodiments of the invention have been described, it will be apparent to those of ordinary skill in the art that many more embodiments and implementations are possible that are within the scope of this invention.

What is claimed is:

1. In a network switch including a plurality of processing engines, a method of coordinating the operation of the processing engines, comprising:
  receiving a request for a connection at the network switch;

assigning a semaphore to the connection;
storing the semaphore at the processing engines;
at one of the processing engines, receiving an internal message including a semaphore value;
comparing the stored semaphore to the semaphore value; and
at the one of the processing engines, processing the internal message based on the comparison of the stored semaphore and the semaphore value.

2. The method of claim 1, further comprising:
pre-loading a memory with a plurality of semaphores assignable to connections.

3. The method of claim 1, further comprising:
in the one of the processing engines, allocating resources to the connection if the stored semaphore is equal to the semaphore value.

4. The method of claim 1, further comprising:
in the one of the processing engines, de-allocating resources assigned to the connection if the stored semaphore is equal to the semaphore value.

5. The method of claim 1, wherein the semaphore is a generation count.

6. The method of claim 5, further comprising:
terminating the connection;
incrementing the generation count; and
storing the incremented generation count in a memory.

7. The method of claim 6, further comprising:
returning the incremented generation count to a first-in-first-out (FIFO) memory so that the incremented generation count is assignable to a subsequently received connection request.

8. The method of claim 1, further comprising:
generating an exception response based on the comparison of the stored semaphore and the semaphore value.

9. A method of processing a packet received by a switch having a plurality of processors, comprising:
at an origination processor, assigning a semaphore to an internal message associated with the packet;
passing the internal message to another of the processors;
performing processing operations relating to the packet at the another of the processors, based on the internal message; and
returning to the origination processor a response including the semaphore, for indicating that the processing operations are completed.

10. The method of claim 9, further comprising:
upon receipt of the internal message at the another of the processors, allocating resources within the another of the processors for performing the processing operations.

11. The method of claim 10, wherein the resources are shared.

12. A network switch, comprising:
a first processing engine for assigning a semaphore to one or more packets associated with a connection; and
a second processing engine, in communication with the first processing engine, having a memory for storing the semaphore and an interface for receiving an internal message including a semaphore value, the second processing engine processing the packets based on a comparison of the stored semaphore and the semaphore value.

13. The network switch of claim 12, further comprising:
a first-in-first-out (FIFO) memory, operatively associated with the first processing engine, for storing a plurality of semaphores assignable to a plurality of connections.

14. The network switch of claim 13, further comprising:
a central processing unit (CPU) configured to pre-load the FIFO memory with the semaphores.

15. The network switch of claim 12, wherein the second processing engine further comprises:
shared resources allocated for processing the packets if the stored semaphore is equal to the semaphore value.

16. The network switch of claim 12, wherein the semaphore is a generation count.

17. The network switch of claim 16, further comprising:
means for terminating the connection;
means for incrementing the generation count; and
means for storing the incremented generation count in a FIFO memory.

18. The network switch of claim 16, further comprising:
means for returning the incremented generation count to the FIFO memory so that the incremented generation count is assignable to a subsequently received connection request.

19. The network switch of claim 12, further comprising:
means for generating an exception response based on the comparison of the stored semaphore and the semaphore value;
means for comparing the stored semaphore to the semaphore value; and
means for processing the internal message or generating an exception response.

* * * * *